US006530692B2

(12) United States Patent
Wyer

(10) Patent No.: US 6,530,692 B2
(45) Date of Patent: Mar. 11, 2003

(54) BEARING

(75) Inventor: Andrew F. Wyer, Comberton (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/228,883

(22) Filed: Aug. 27, 2002

(65) Prior Publication Data
US 2003/0002758 A1 Jan. 2, 2003

Related U.S. Application Data

(62) Division of application No. 09/671,969, filed on Sep. 29, 2000, now Pat. No. 6,467,965.

(51) Int. Cl.[7] ............................................... F16C 32/02
(52) U.S. Cl. ...................................... 384/295; 399/117
(58) Field of Search ............................. 384/215, 220, 384/275, 276, 295, 296, 297, 428, 438, 439; 399/117

(56) References Cited

U.S. PATENT DOCUMENTS

| 2,339,161 A | 1/1944 | Fermier |
| 2,424,757 A | 7/1947 | Klumpp, Jr. ................ 174/153 |
| 2,884,283 A | 4/1959 | Korol et al. .................. 308/15 |
| 3,065,035 A | 11/1962 | Biesecker ..................... 308/15 |
| 3,372,960 A | 3/1968 | Fisher .......................... 308/15 |
| 4,134,175 A | 1/1979 | Contoyanis ...................... 16/2 |
| 4,154,527 A | 5/1979 | Schnall et al. ................. 355/75 |
| 4,344,658 A | 8/1982 | Ledgerwood, III |
| 4,624,585 A | 11/1986 | Nix et al. ..................... 384/296 |
| 4,675,937 A | 6/1987 | Mitomi ........................... 16/2 |
| 4,804,277 A | 2/1989 | Counoupas ................... 384/537 |
| 4,887,331 A | 12/1989 | Thomas .......................... 16/2 |
| 5,131,733 A | 7/1992 | Lautenschlager et al. ...................... 312/334.38 |
| 5,261,658 A | 11/1993 | Nagai .......................... 271/297 |
| 5,457,520 A | 10/1995 | Schell et al. ................. 355/213 |
| 5,511,885 A | 4/1996 | Coleman ...................... 384/439 |
| 5,538,475 A | 7/1996 | Jaskowiak ................... 464/181 |
| 5,632,684 A | 5/1997 | Kumar et al. ................ 464/179 |
| 5,636,820 A | 6/1997 | Domenig ................. 248/220.21 |
| 5,852,760 A | 12/1998 | Harris et al. ................. 399/262 |
| 5,857,129 A | 1/1999 | Harris ............................ 399/12 |
| 6,024,497 A | 2/2000 | Leibman ...................... 384/428 |
| 6,058,280 A | 5/2000 | Kumar et al. ................ 399/117 |
| 6,089,484 A | 7/2000 | Zwayer et al. ............... 242/321 |

Primary Examiner—Thomas R. Hannon
(74) Attorney, Agent, or Firm—Andrew D. Ryan

(57) ABSTRACT

A bearing for use in a reproduction machine includes an elongated body having an elongated first portion and an elongated second portion. The first portion extends radially outward from the second portion. The second portion includes a lumen for receiving and supporting a shaft. Resilient elongated members originate from the second portion and extend radially outward toward the first portion and are spaced from the second portion over a portion thereof. The resilient members are movable between a first position and a second position for removable securement to a wall in a reproduction machine.

16 Claims, 5 Drawing Sheets

FIG. 6
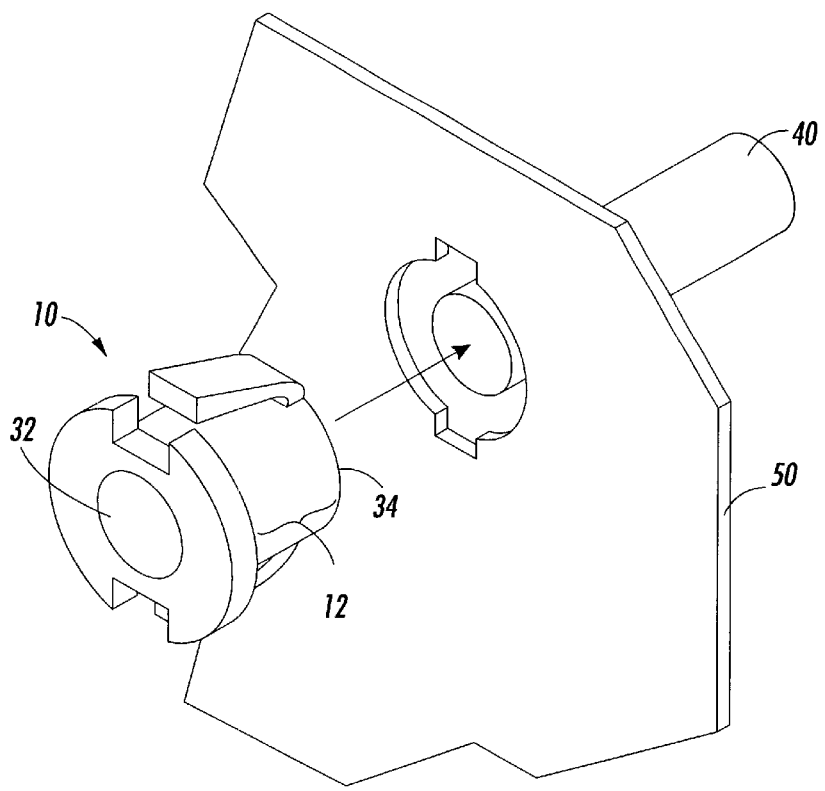
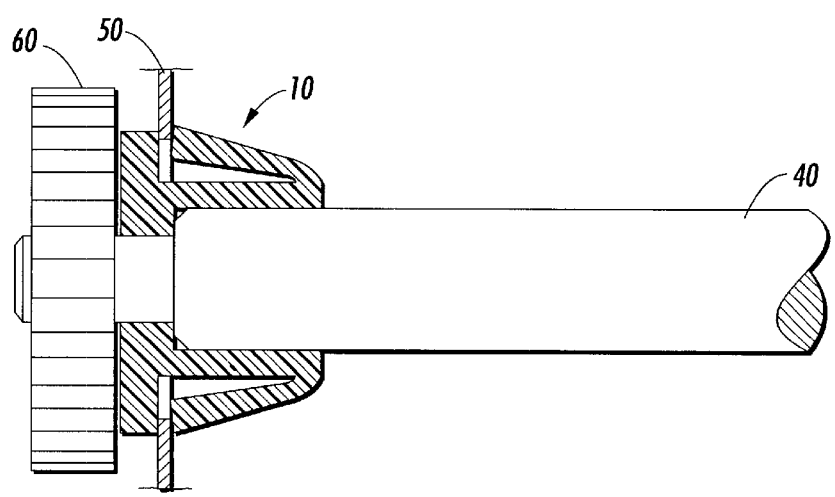
FIG. 7

BEARING

CROSS-REFERENCE TO RELATED APPLICATION

This is a divisional of application Ser. No. 09/671,969 filed on Sep. 29, 2000 now U.S. Pat. No. 6,467,965.

FIELD OF THE INVENTION

The present invention relates to a bearing that fits and is removable and/or securable to a wall of a reproduction apparatus. The features of the present invention provide in embodiments a mounting system advantageously for use in most any apparatus which requires bearings, for example, electrophotographic printing machines.

BACKGROUND OF THE INVENTION

Electrophotographic marking is a well-known, commonly used method of copying or printing documents. Electrophotographic marking is performed by exposing a charged photoreceptor with a light image representation of a desired document. The photoreceptor is discharged in response to that light image, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for the production of other images. Other marking technologies, for example, electrostatographic marking and ionography are also well-known.

An electrophotographic marking machine generally includes bearings for supporting and connecting parts, for example, a shaft. While such bearings are generally successful, fastening of the bearing to a member may be time consuming and costly. Bearings may add to the cost of the machine. Further, the bearing may wear or fail and cause inefficient operation of the machine. In addition, manufacturing time is required to install the bearings and to connect the components to the bearings during assembly of the machine.

Also, to conserve natural resources and provide for a machine with improved features and more reliable newer technology, machinery is often remanufactured and disassembled. Furthermore, the removal of the bearings represents a cost associated with remanufacturing of the machines. The time required to remove bearings may be a significant remanufacturing cost factor. Components have typically been joined together with the use of bearings in the form of welding, rivets or screws. Rivets require the use of special machinery to assemble, may become loose and rattle during use and are difficult and expensive to remove for remanufacturing. Screws have disadvantages in that they require a substantial amount of assembly time, may become loose during use, and may become very time consuming to remove. Therefore, a bearing that may be easily manufactured and that is removeably securable to a surface for use with other parts would be beneficial.

Moreover, it has been increasingly important to develop lighter materials for the framework of the machines. Accordingly, many modern machines utilize a fabricated sheet metal or plastic frame resulting in relatively thin walled support structures. Throughout a typical printing machine, there are many shafts utilized to support idler rollers, drive rollers. It is therefore desirable to provide a bearing which can be utilized in a wall while still providing generally high durability.

Reference is made to the following United States patents relating to reproduction machines and components such as bearings briefly summarized as follows:

U.S. Pat. No. 6,024,497 relates to a bushing mountable in a housing for supporting a rotating member and for providing a bias force to the rotating member. The bushing includes a body defining an aperture therein and a mounting member for mounting the bushing to the housing. The bushing also includes a biasing member operably associated with said body and said mounting member.

U.S. Pat. No. 5,632,684 relates to a shaft assembly and method of forming a shaft assembly having an elongated hollow shaft with a stepped portion on the surface of the shaft. The stepped portion of the shaft surface is formed of two straight edge sections joined by an inclined section. A gear having a corresponding straight/inclined edge configuration engages the shaft and contacts the shaft only on the corresponding straight edge portions.

U.S. Pat. No. 5,538,475 relates to a shaft assembly comprising an elongated member having at least a portion which is hollow, tubular, shell like having an inside surface defining a shaft core and an outside surface defining a shaft functional surface, the shaft core being filled with a hardened, moldable material, and the shaft functional surface having at least one functional feature thereon, which is of hardened, moldable material integrally molded with the hardened, moldable material in the shaft core.

U.S. Pat. No. 5,511,885 relates to a plain flanged bearing or bushing for supporting a rotating shaft in a thin walled frame of an electrophotographic printing machine. The composite bearing has a flanged end and is adapted to be inserted in an opening in a thin walled support member until the flange abuts the surface of the wall. A protruding tab formed by displacing a small portion of the flange extends in an axial direction along the bearing and cooperates with a corresponding opening in the wall to prevent rotation of the bearing. A friction push nut or snap ring is attached to the bearing on the side of the wall opposite the flange. The protruding tab prevents the bearing from rotating about an axis which can cause the bearing to be worn on the exterior surface by rotational contact with the thin wall. A shaft to support idler rolls or other rotating elements is inserted in an inner bore of the bearing and is rotatably supported thereby.

U.S. Pat. No. 5,457,520 relates to a bearing for supporting a moving member on a support structure. The bearing includes a substantially U-shaped member having an internal periphery and an external periphery. The bearing also includes a first securer, associated with the internal periphery of the U-shaped member, for securing the moving member to the U-shaped member and a second securer, associated with the external periphery of the U-shaped member, for securing the U-shaped member to the support structure.

U.S. Pat. No. 4,804,277 relates to a bearing mounting system for mounting and retaining a rotatable shaft between first and second bearings mounted to first and second spaced frame members of a machine frame, utilizing commercially available bearings, with respective inner and outer races. Both bearings inner races are press fitted onto the shaft.

U.S. Pat. No. 4,134,175 relates to a non-rotating sleeve type bushing in which an eccentric flange integral with the bushing and projecting radially outwardly therefrom is so formed as to be received in a complementarily contoured flange recess in a bearing housing whereby rotation of the bushing with respect to the bearing housing is precluded by a positive mechanical locking action provided by the shear resistance of the flange member.

All documents cited herein, including the foregoing, are incorporated herein by reference in their entireties.

SUMMARY OF THE INVENTION

The present invention relates to embodiments of a bearing with snap-fit features for use in walls of reproduction machines.

In accordance with one aspect of the present invention, there is provided, a bearing having an elongated body and including a first portion and a second portion. The first portion has a first length, a first outer periphery, a first surface, and at least one notch. The second portion has a second length, an opening, and a lumen for receiving and supporting a shaft, a second outer periphery, and at least one resilient member originating from the second outer periphery of the second portion. The at least one resilient member extends radially outward toward the first portion and is spaced from the second outer periphery of the second portion over a portion of the elongated body. The first surface of the first portion extends radially inward from the first outer periphery to the second outer periphery on the second portion. The at least one resilient member is movable between a first position and a second position for removable securement to a wall.

In accordance with another aspect of the present invention, there is provided, a bearing and shaft assembly in an electrostatographic machine including a development station, a bearing, wall, and a shaft. The bearing includes: (a) a first portion having a first length, a first outer periphery, a first surface, and at least one notch; (b) a second end portion having a second length, an opening, and a lumen for receiving and supporting a shaft; and (c) at least one resilient member originating from the outer periphery of the second portion. The resilient member extends radially outward toward the first portion and is spaced from the outer periphery of the second portion over a portion of the second portion. The resilient member has an end movable between a first position and a second position to cooperate with the wall of a housing of the electrostatographic machine. The bearing is adapted for removable securement to the wall. The shaft is rotatably disposed in the lumen of the bearing.

In accordance with another aspect of the present invention, there is provided, a bearing including an elongated body. The elongated body includes a first portion and a second portion. The first portion has a length, perimeter, and at least one notch. The second portion has a length and forms an aperture to support a second member being rotatably fittable therein. At least one resilient member is formed integral with the body. The body and the resilient member cooperate to secure a wall therebetween. The first portion includes a flange extending outwardly from the second portion. The flange and the at least one resilient member cooperate with the wall to limit displacement of the body with respect to the wall in a direction of an axis of the second member.

Still other features, aspects and advantages of the present invention and methods of construction of the same will become readily apparent to those skilled in the art from the following detailed description. As will be realized, the invention is capable of other and different embodiments and methods of construction, and its several details are capable of modification in various obvious respects, all without departing from the invention. Accordingly, the drawing and description are to be regarded as illustrative in nature, and not as restrictive.

BRIEF DESCRIPTION OF THE DRAWINGS

FIG. 6 illustrates a perspective view of a mounting system for another embodiment of the present invention of FIG. 5;

FIG. 7 illustrates a cross-sectional view of the bearing of FIGS. 5–6 along with a gear disposed thereon.

DETAILED DESCRIPTION OF THE INVENTION

While the principles of the present invention will be described in connection with an electrostatographic reproduction machine, it should be understood that the present invention is not limited to that embodiment or to that application. Therefore, it is should be understood that the principles of the present invention extend to all alternatives, modifications and equivalents as may be included within the spirit and scope of the appended claims.

The present invention relates to embodiments of a bearing for use in walls of reproduction machines. Although the bearing of the present invention is particularly well adapted for use in the illustrative printing machine, it will become evident that the bearing is equally well suited for use in a wide variety of machines and are not necessarily limited in its application to the particular embodiment shown herein.

Figure 8:
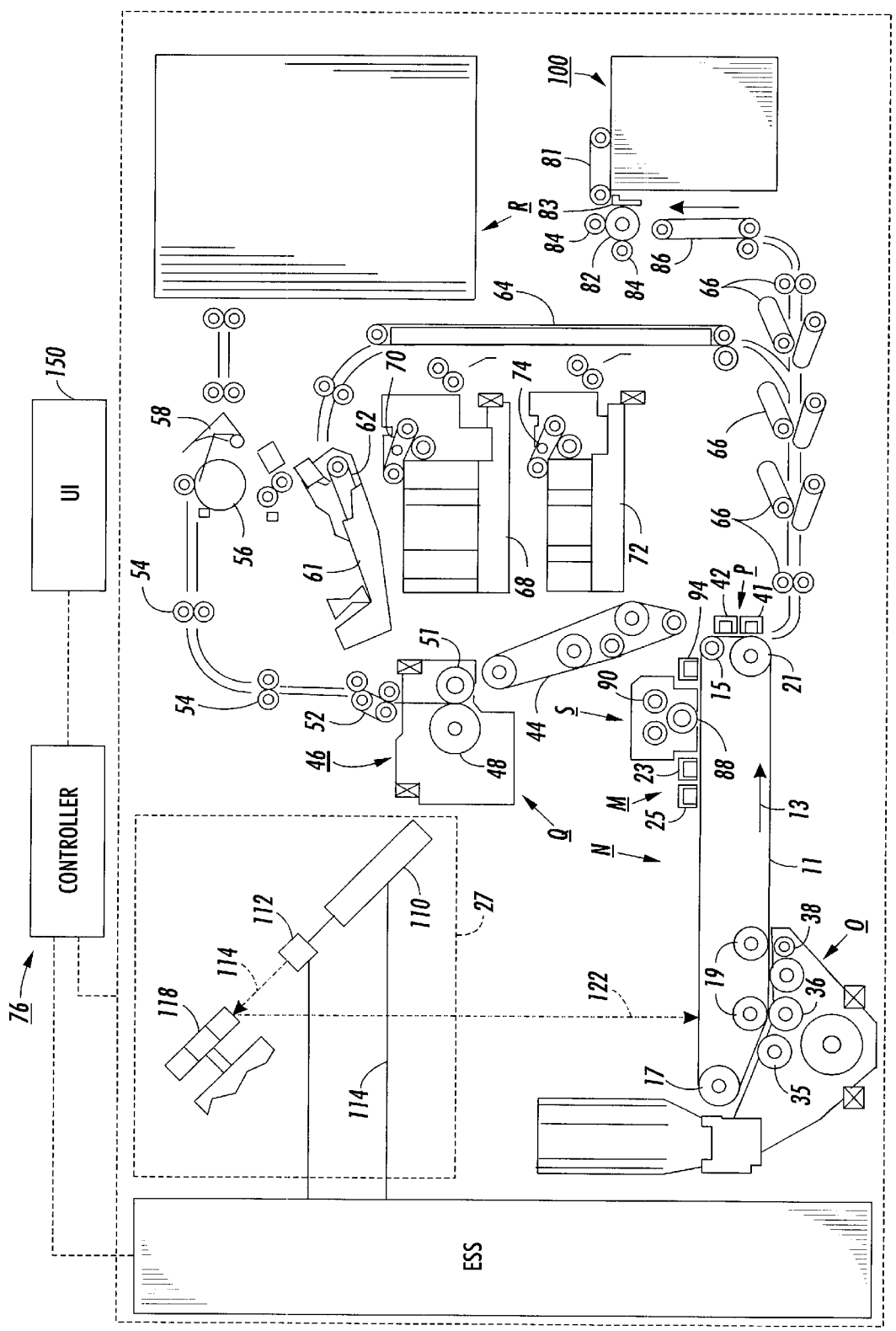
FIG. 8 is a schematic elevational view of an electrophotographic printing machine utilizing the present invention.

Referring to FIG. 8 of the drawings, an illustrative reproduction machine incorporating the bearing of the present invention is shown. The reproduction machine employs a photoconductive belt 11. Belt 11 moves in the direction of arrow 13 to advance successive portions sequentially through the various processing stations disposed about the path of movement thereof. Belt 11 is entrained about stripping roller 15, tensioning roller 17, idler roll 19 and drive roller 21. As roller 21 rotates, it advances belt 11 in the direction of arrow 13.

Initially, a portion of the photoconductive surface passes through charging station M. At charging station M, two corona generating devices indicated generally by the reference numerals 23 and 25 charge the photoconductive belt 11 to a relatively high, substantially uniform potential.

Next, the charged portion of the photoconductive surface is advanced through imaging station N. At the imaging station, an imaging module indicated generally by the reference numeral 27, records an electrostatic latent image on the photoconductive surface of the belt 11. Imaging module 27 includes a raster output scanner (ROS). The ROS lays out the electrostatic latent image in a series of horizontal scan lines with each line having a specified number of pixels per inch. Other types of imaging systems may also be used employing, for example, a pivoting or shiftable LED write bar or projection LCD (liquid crystal display) or other electro-optic display as the "write" source.

The imaging module 27 (ROS) includes a laser 110 for generating a collimated beam of monochromatic radiation 122, an electronic subsystem (ESS) associated with the machine electronic printing controller 76 transmits a set of signals via 114 corresponding to a series of pixels to the laser 110 and/or modulator 112, a modulator and beam shaping optics unit 112, which modulates the beam 122 in accordance with the image information received from the ESS, and a rotatable polygon 118 having mirror facets for sweep deflecting the beam 122 into raster scan lines which sequentially expose the surface of the belt 11 at imaging station N. A user interface (Ul) 150 is associated with the controller 76.

Thereafter, belt 11 advances the electrostatic latent image recorded thereon to development station O. Development station O has three magnetic brush developer rolls indicated generally by the reference numerals 35, 36 and 38. A paddle wheel picks up developer material and delivers it to the developer rolls. When the developer material reaches rolls 35 and 36, it is magnetically split between the rolls with half of the developer material being delivered to each roll. Photoconductive belt 11 is partially wrapped about rolls 35 and 36 to form extended development zones. Developer roll 38 is a clean-up roll. The latent image attracts toner particles from the carrier granules of the developer material to form a toner powder image on the photoconductive surface of belt 11. Belt 11 then advances the toner powder image to transfer station P.

At transfer station P, a copy sheet is moved into contact with the toner powder image. First, photoconductive belt 11 is exposed to a pretransfer light from a lamp (not shown) to reduce the attraction between photoconductive belt 11 and the toner powder image. Next, a corona, generating device 41 charges the copy sheet to the proper magnitude and polarity so that the copy sheet is tacked to photoconductive belt 11 and the toner powder image is attracted from the photoconductive belt to the copy sheet. After transfer, corona generator 42 charges the copy sheet to the opposite polarity to detach the copy sheet from belt 11. Conveyor 44 then advances the copy sheet to fusing station Q.

Fusing station Q includes a fuser assembly 46 which permanently affixes the transferred toner powder image to the copy sheet. Preferably, fuser assembly 46 includes a heated fuser roller 48 and a pressure roller 51 with the powder image on the copy sheet contacting fuser roller 48. The pressure roller is cammed against the fuser roller to provide the necessary pressure to fix the toner powder image to the copy sheet. The fuser roll 48 is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station R, or to duplex tray 60. At finishing station R, copy sheets are stacked in a compiler tray and attached to one another to form sets. When duplex solenoid gate 58 diverts the sheet into duplex tray 61. Duplex tray 61 provides an intermediate or buffer storage for those sheets that have been printed on one side and on which an image will be subsequently printed on the second, opposite side thereof, i.e., the sheets being duplexed. The sheets are stacked in duplex tray 61 facedown on top of one another in the order in which they are copied.

To complete duplex copying, the simplex sheets in tray 61 are fed, in seriatim, by bottom feeder 62 from tray 60 back to transfer station P via conveyor 64 and rollers 66 for transfer of the toner powder image to the opposed sides of the copy sheets. Inasmuch as successive bottom sheets are fed from duplex tray 61, the proper or clean side of the copy sheet is positioned in contact with belt 11 at transfer station P so that the toner powder image is transferred thereto. The duplex sheet is then fed through the same path as the simplex sheet to be advanced to finishing station R.

The high capacity variable sheet size sheet feeder 100 is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station P.

Secondary tray 68 and auxiliary tray 72 are secondary sources of copy sheets. Copy sheets are fed to transfer station P from the secondary tray 68 or auxiliary tray 72. Sheet feeders 70, 74 are friction retard feeders utilizing feed belts and take-away rolls to advance successive copy sheets to transport 64 which advances the sheets to rolls 66 and then to transfer station P. The copy sheet is registered just prior to entering transfer station P so that the sheet is aligned to receive the developed image thereon.

Invariably, after the copy sheet is separated from the photoconductive belt 11, some residual particles remain adhering thereto. After transfer, photoconductive belt 11 passes beneath corona generating device 94 which charges the residual toner particles to the proper polarity. Thereafter, the pre-charge erase lamp (not shown), located inside photoconductive belt 11, discharges the photoconductive belt in preparation for the next charging cycle. Residual particles are removed from the photoconductive surface at cleaning station S. Cleaning station S includes an electrically biased cleaner brush 88 and two de-toning rolls 90.

The various machine functions are regulated by a controller 76. The controller 76 is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 1:
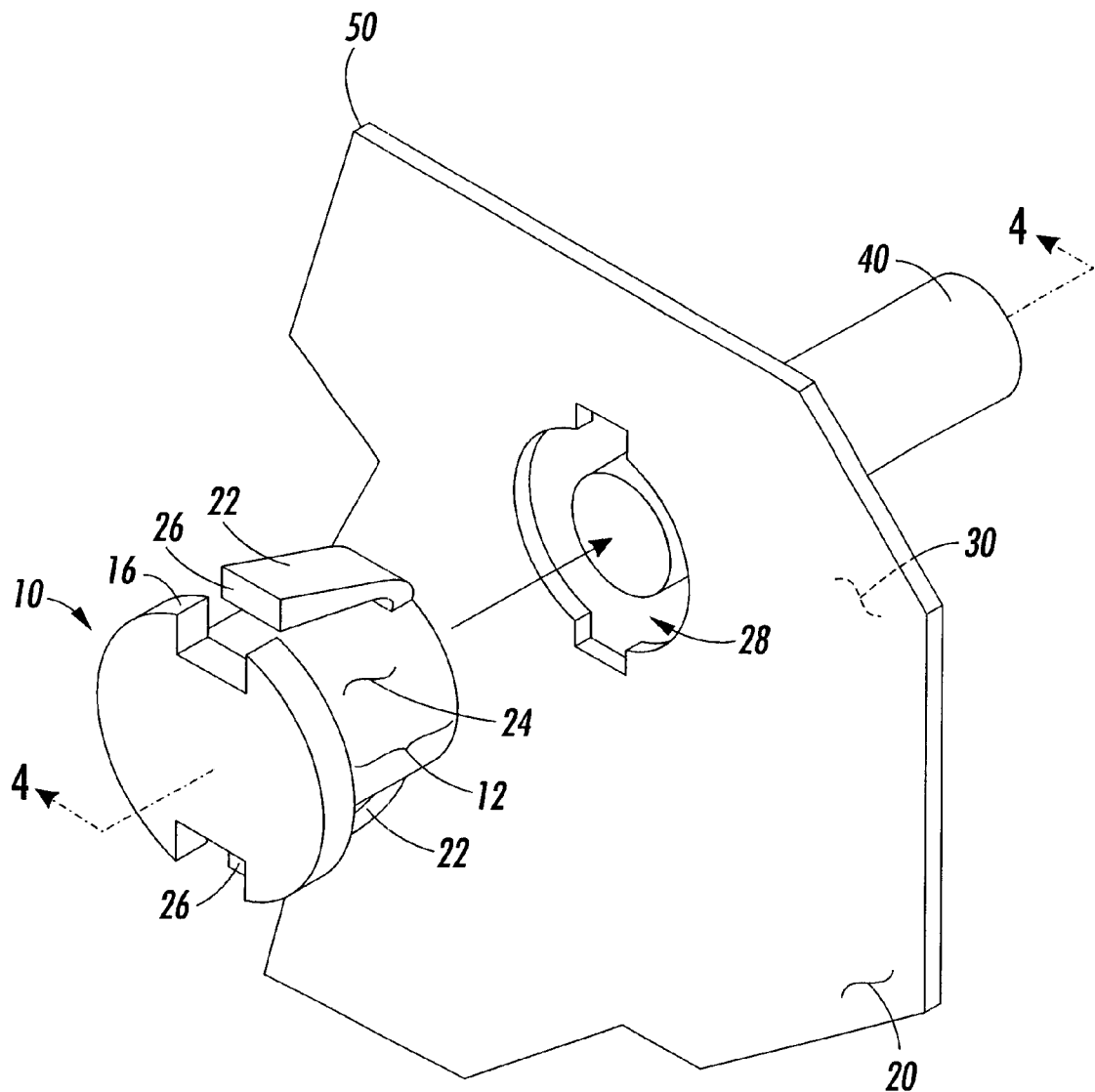
FIG. 1 illustrates a perspective view of a mounting system for an embodiment of the present invention.

Turning now to FIG. 1, illustrated is a partial cut-away view from the FIG. 8 reproduction machine illustrating one of the bearings 10 of the present invention as it is about to be installed in a wall 50. Also shown is a shaft 40 as it is about to be installed into a shaft support portion 12 of the bearing 10. The shaft support portion 12 has a bore 14 (not shown) that is formed in a generally cylindrical shape to allow rotation of the shaft 40 therein. A flange 16 extends radially from the shaft support portion 12. In operation, the bearing 10 is inserted into the wall 50 until a surface 18 (not shown) of the flange 16 contacts a surface 20 of the wall 50.

A plurality of flexible members 22 are used to hold the bearing 10 substantially secure to the wall 50. The flexible members 22 originate from an outside surface 24 on the shaft support portion 12 and then extend toward the flange 16. After the surface 18 of the flange 16 is positioned against the wall 50, radial pressure to the flexible members 22 is released and the ends 26 of the flexible members 22 adjust to their free state to a position which is wider than an opening 28 in the wall 50. The ends 26 of the flexible members 22 apply force against the surface 30 of the wall 50 and physically impede the bearing 10 from rotating about its axis and from becoming unsecured from the wall 50. The ends 26 of the flexible members 22 have sufficient surface area for contact with the wall 50 to limit rotation of the bearing 10.

Figure 2:
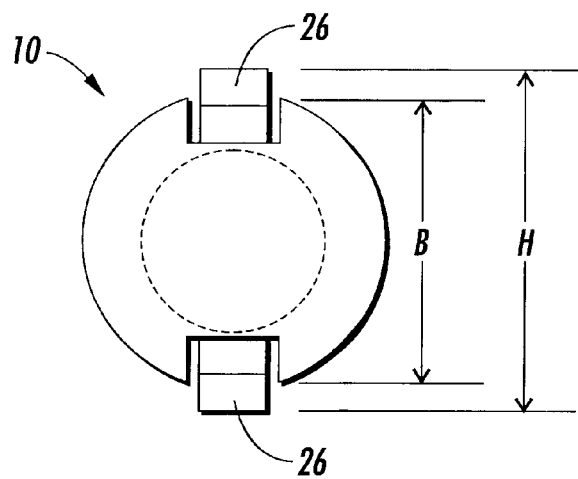
FIG. 2 illustrates a front elevational view of the bearing of FIG. 1.
Figure 3:
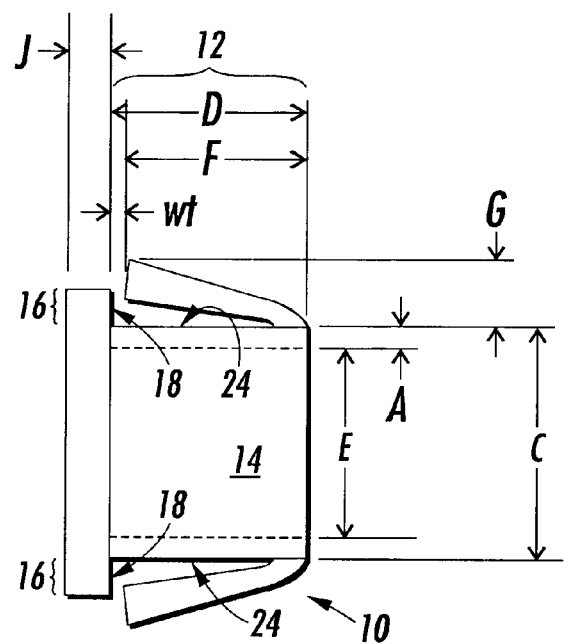
FIG. 3 illustrates a side elevational view of the bearing of FIG. 1.

FIGS. 2 and 3 illustrate front and side elevational views of the bearing 10. The flexible members 22 are flexible and are moveable from an expanded free state to a lower profile state, less than the expanded free state, sufficient to allow passage of the members 22 through the opening 28 in the wall 50. The bearing 10 may be molded of plastic, in one piece. The flange 16 has notches to enable manufacture of the members 22 in a two-part mold using an injection molding process. The notches may also aid in gripping the bearing 10 during insertion. The opening 28 in the wall 50 may also have notches to aid in insertion of the bearing 10 and to allow the members 22 to clear the wall 50. The bearing 10 then may be rotated such that the flexible members 22 are situated away from the notches in the opening 28. Alternatively, the ends 26 of the flexible members 22 may be formed into a offset shape and extend sufficiently over an edge of the wall 50 into the notch area of the wall opening 28 to prevent rotation of the bearing 10. In addition, the ends 26 of the flexible members 22 may also have a chamfer or angular portions for aiding positioning of the ends 26 into the notch of the opening 28.

The flange 16 includes an end cap to restrain the end of the shaft 40 thus making the use of clips such as 'e' clips unnecessary. The flange 16 may be circular, square, rectangular, or irregular, provided it is of sufficient size, for example, a sufficient diameter to provide stability against the surface 20 of the wall 50 and to cover the opening 28 in the wall 50.

The dimensions of the bearing 10 are intended to be suited for applications inside a reproduction machine although additional sizes and uses are envisioned. The shaft support portion 12 may have a wall thickness "A" ranging from about 0.0625 inches to about 0.1875 inches. The shaft 40 has a diameter of ranging from about 6–10 mm (0.2362 inches –0.3938 inches) and the wall 50 has a thickness of approximately 1–2 mm (0.0394 inches –0.0788 inches). The bearing 10 may have a space WT between surface 18 of the flange 16 and the end 26 of the flexible members 16 in order to allow the wall 50 to fit therein. The flange 16 may have a diameter "B" ranging from about 0.5 inches to about 1.0 inches and a length "J" ranging from about 0.25 inches to about 0.5 inches. The shaft support portion 12 may have an outside diameter "C" ranging from about 0.3125 inches to about 0.625 inches and a length "D" ranging from about 0.3125 inches to about 0.625 inches. The shaft support portion 12 may have a bore 14 with an inside diameter "E" ranging from about 0.25 inches to about 0.5 inches. The flexible members 22 have a length "F" ranging from about 0.3 inches to about 0.6 inches and they extend radially outward from the outside surface 24 of the shaft support portion 12 for a distance "G" ranging from about 0.1 inches to about 0.2 inches. In use, an end 26 of the flexible member 22 may move radially a distance ranging from about 0.05 inches to about 0.1 inches. The distance H measured between the outer most surfaces of the flexible member 22 ranges from about 0.5125 inches to about 1.025 inches.

Figure 4:
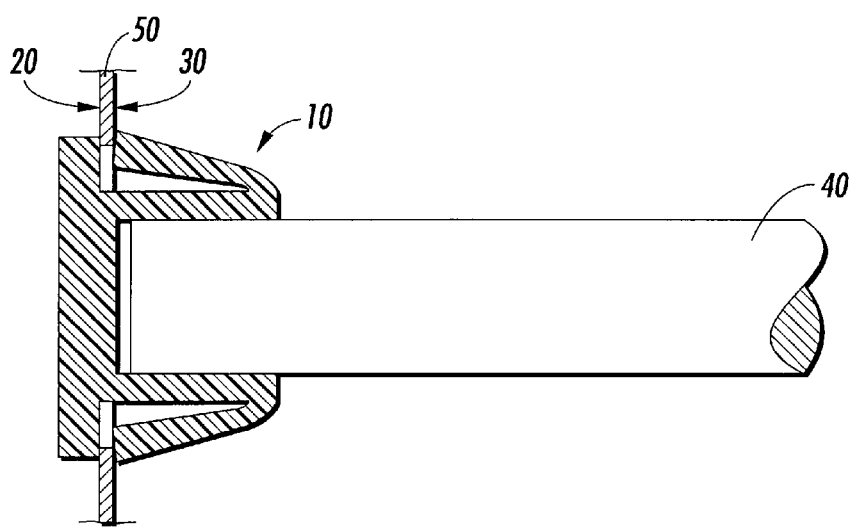
FIG. 4 illustrates a cross-sectional view of the bearing of FIG. 1 disposed in a wall along with a shaft disposed in the bearing.

FIG. 4 illustrates a cross-sectional view of the bearing 10 disposed in a wall 50. The shaft 40 is disposed in the shaft support portion 12 of the bearing 10. The bearing 10 is intended to support a rotatable shaft 40 which may be used for idler rollers, drive rollers, belt rollers or any other shaft use within a reproduction machine.

Figure 5:
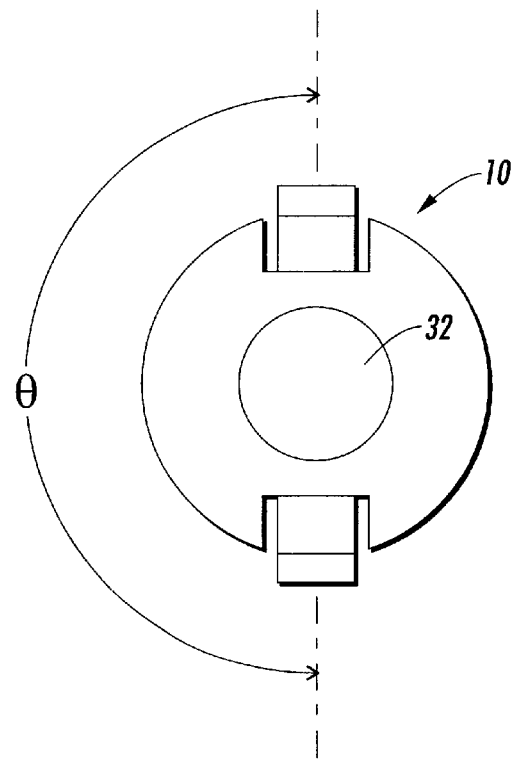
FIG. 5 illustrates a front elevational view of another embodiment of the bearing.

An alternative embodiment of the bearing 10 is illustrated in FIGS. 5–7 in which the flange portion 16 includes an opening 32 to allow a portion of the shaft 40 to pass through. FIG. 5 illustrates an end view of the bearing 10 with the opening 32 for the shaft 40 to partially extend therethrough.

Turning now to FIG. 6, illustrated is a partial cut-away view of the bearing 10 of FIG. 5 as it is about to be installed in a wall 50. Also shown is a shaft 40 as it is about to be installed into an end 34 of the bearing 10 for rotation in a shaft support portion 12.

In FIG. 7, illustrated is a cross-sectional view of the bearing 10 of FIGS. 5–6 disposed in a wall 50. The bearing 10 is removeably securable to the wall 50. The shaft 40 is installed into an end of the bearing 10 and extends partially out the other end through the flange 16. The shaft 40 is shown stepped to a smaller diameter prior to passing through the flange 16. A gear 60 is disposed on the end of the shaft 40. As the gear 60 rotates, the shaft 40 rotates in the shaft support portion 12.

Other embodiments and features of the bearing 10 are also envisioned. A resilient member may be spaced apart from another resilient member an angular distance θ ranging from about 60 degrees to about 180 degrees. The bearing 10 may be constructed of plastic including Delrine® 500CL which is commercially available from Dupont®. The bearing may include a plastic resin such as an Acetal resin. Other materials such as nylon may also be used so as to provide a generally low friction bearing surface for the rotation shaft 40. The inside surface of the bearing 10 may have a coefficient of friction ranging from about 0.2 to about 0.3. The plastic may have a hardness of about 1.3 ft-lb/in. The bearing 10 is advantageously made of one material using a generally simple molding process. In an alternative embodiment, the bearing 10 may include a metal insert bearing (phosphor bronze) or ball race in the bore 14.

In summary, a bearing 10 is provided for supporting a rotatable shaft 40 in a wall 50 of a reproduction machine. The bearing 10 described herein can generally be easily mounted in a reproduction machine, can generally allow easier assembly, and can generally be replaced without the necessity of complex disassembly of many components.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An imaging process comprising:
   installing at least one bearing in a wall of an imaging machine, the bearing including: (1) a first portion having a length, perimeter, and at least one notch; (2) a second portion having a length and defining an aperture therein adapted to support a shaft being rotatably fittable in the aperture; and (3) at least one resilient member integral with the second portion, the first portion and the at least one resilient member adapted to cooperate and secure a wall member therebetween, the first portion includes a flange extending outwardly from the second portion, the flange and the at least one resilient member are adapted to limit displacement of the bearing with respect to the wall in a direction of an axis of the shaft, the imaging machine including a development station;

installing the shaft into an aperture of the bearing;

rotating the shaft in the machine, the rotation of the shaft causing a member functionally associated with the shaft to rotate;

forming an image of a document; and transferring the image on to a flexible member;

wherein the bearing supports the shaft as the shaft rotates during operation of the imaging machine including the process of transferring the image on to the flexible member.

2. The imaging process of claim 1 further comprising moving the at least one resilient member between a first position and a second position prior to installing the shaft into an aperture of the bearing.

3. The imaging process of claim 1 wherein the at least one bearing is adapted for removable securement to the wall.

4. The imaging process of claim 1 wherein the at least one resilient member extends to a distal end, the distal end and the flange defining a space therebetween.

5. The imaging process of claim 1 wherein the at least one bearing is formed in one-piece.

6. The imaging process of claim 5 wherein the at least one bearing comprises a plastic.

7. The imaging process of claim 1, wherein the at least one resilient member includes a first resilient member and a second resilient member that are spaced apart.

8. The imaging process of claim 1 wherein the imaging machine is a xerographic apparatus.

9. The imaging process of claim 1 wherein the first portion is closed to prevent passage of a shaft therethrough.

10. The imaging process of claim 1 wherein the first portion has a first opening and the second portion has a second opening, the first opening is smaller than the second opening.

11. An imaging process comprising:

providing a development station;

providing a wall of a housing associated with an imaging machine and the development station;

inserting into the wall a bearing comprising: (a) a flange having a length and an outer periphery; (b) a tubular member extending a length from the flange, the tubular member including an outer periphery, an opening, and a lumen for receiving and rotatably supporting a shaft therein; and (c) at least one resilient member originating from the outer periphery of the tubular member, the at least one resilient member extending radially outward toward the flange and being spaced from the outer periphery of the tubular member, the at least one resilient member having an end movable between a first position and a second position to cooperate with the wall of the housing, the bearing is adapted for removable securement to the wall; and inserting a shaft in the lumen of the bearing; and rotating the shaft causing an image transfer in the imaging machine.

12. The imaging process of claim 11 wherein at least one resilient member is spaced apart from another resilient member an angular distance θ ranging from about 60 degrees to about 180 degrees.

13. The imaging process of claim 11 wherein the shaft extends through the flange and further comprises a gear disposed on the shaft.

14. The imaging process of claim 11 wherein the bearing includes a second resilient member positioned opposed to a first resilient member.

15. The imaging process of claim 11 wherein the bearing comprises a plastic resin including an Acetal resin.

16. The imaging process of claim 11 wherein a portion of an outer periphery of the second portion substantially conforms with a portion of an opening in the wall.

* * * * *